United States Patent [19]

Wang

[11] Patent Number: 4,633,905
[45] Date of Patent: Jan. 6, 1987

[54] WATER-MICRO-CONTROLLER

[76] Inventor: Po-Hsiung Wang, No. 91, kuo Tai Road, Chu Nan Chen, Miao Li Hsien, Taiwan

[21] Appl. No.: 816,439

[22] Filed: Jan. 6, 1986

[51] Int. Cl.⁴ ............................................. F16K 31/48
[52] U.S. Cl. .................................... 137/624.11; 239/69
[58] Field of Search ................. 236/44 R, 44 B, 46 F, 236/46 R; 239/63, 64, 67, 69, 70, 71, 74, DIG. 15; 137/624.11, 624.12, 624.13, 624.15, 624.16, 624.21, 551; 222/20

[56] References Cited

U.S. PATENT DOCUMENTS

| | | | |
|---|---|---|---|
| 3,915,185 | 10/1975 | Sanner | 239/63 X |
| 4,165,532 | 8/1979 | Kendall et al. | 239/70 X |
| 4,280,530 | 7/1981 | Yi | 137/624.11 |
| 4,335,852 | 6/1982 | Chow | 137/624.12 X |
| 4,502,288 | 3/1985 | Lynch | 236/44 B X |
| 4,569,020 | 2/1986 | Snoddy et al. | 236/69 X |

Primary Examiner—Harry Tanner
Attorney, Agent, or Firm—Sherman and Shalloway

[57] ABSTRACT

This invention relates to a controller for water discharge and particularly to one which comprises a front cover portion provided with control keys and liquid crystal display which are arranged to cooperate with a control circuit received in the front cover portion to preset the discharging period according to the user's requirement. A rear cover portion furnished with a control valve mechanism is arranged to be secured to the front cover portion. A motor associated with a gear sets and a special designed cam is disposed in the rear cover portion. A post is located in the control valve mechanism and can be actuated by the cam to make the control valve mechanism either in its open state or in its closed state.

4 Claims, 5 Drawing Figures 4,633,905

WATER-MICRO-CONTROLLER

BACKGROUND OF THE INVENTION

This invention relates to a micro-controller and particularly to a a micro-controller for water discharge.

Conventional water timer has the following disadvantages:

1. The water flow detector disposed on the conventional water timer is mechanical type therefore, as the water pressure is beyond the predetermined valve, the water flow thereof can not be precisely controlled.

2. Since lacking the automatic timing system, the control valve of the conventional water timer can only be operated manually.

It is, therefore, an object of the present invention to get rid of and reduce severity of the above-noted drawbacks.

SUMMARY OF THE INVENTION

It is the primary object of the present invention to provide a micro-controller for water discharge wherein a water wheel actuated by water flow rate is cooperated with a reed relay to detect the water pressure and water flow rate therethrough.

It is another object of the present invention to provide a micro-controller for water discharge wherein a plurality of control keys associated with liquid crystal display are used to present the discharging period thereby the controller capable of being operated automatically.

It is still another object of the present invention to provide a water-micro-controller which is easy to fabricate.

It is a further object of the present invention to provide a water-micro-controller which is practical for use.

DETAILED DESCRIPTION OF THE PREFERRED EMBODIMENT

Figure 1:
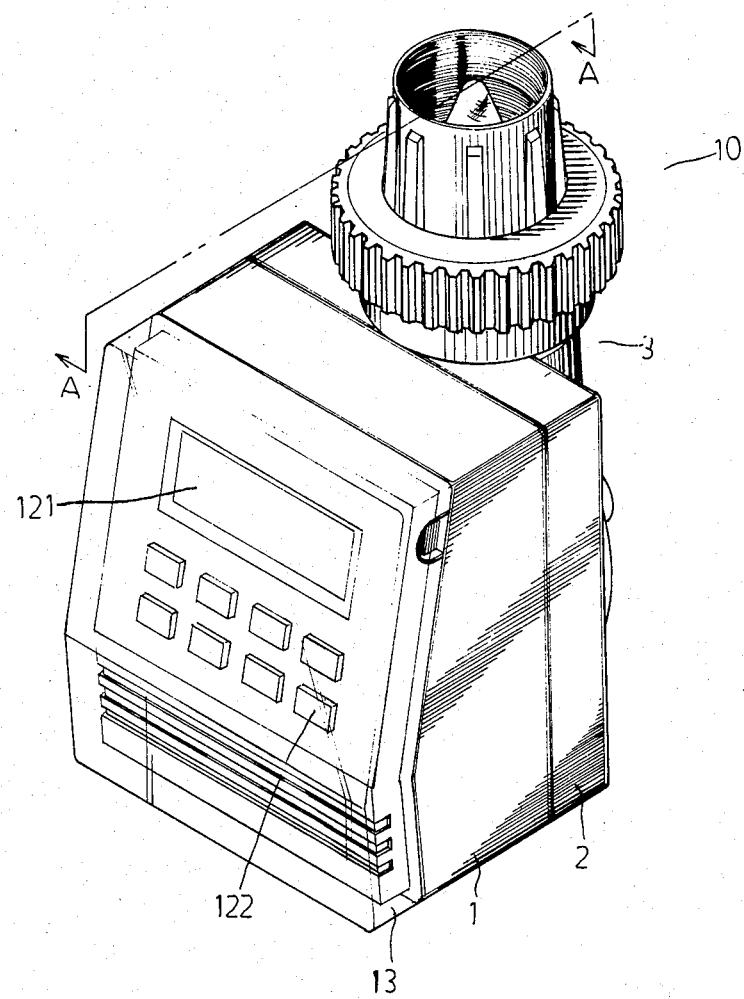
FIG. 1 is a perspective view of a preferred embodiment of the present invention.
Figure 2:
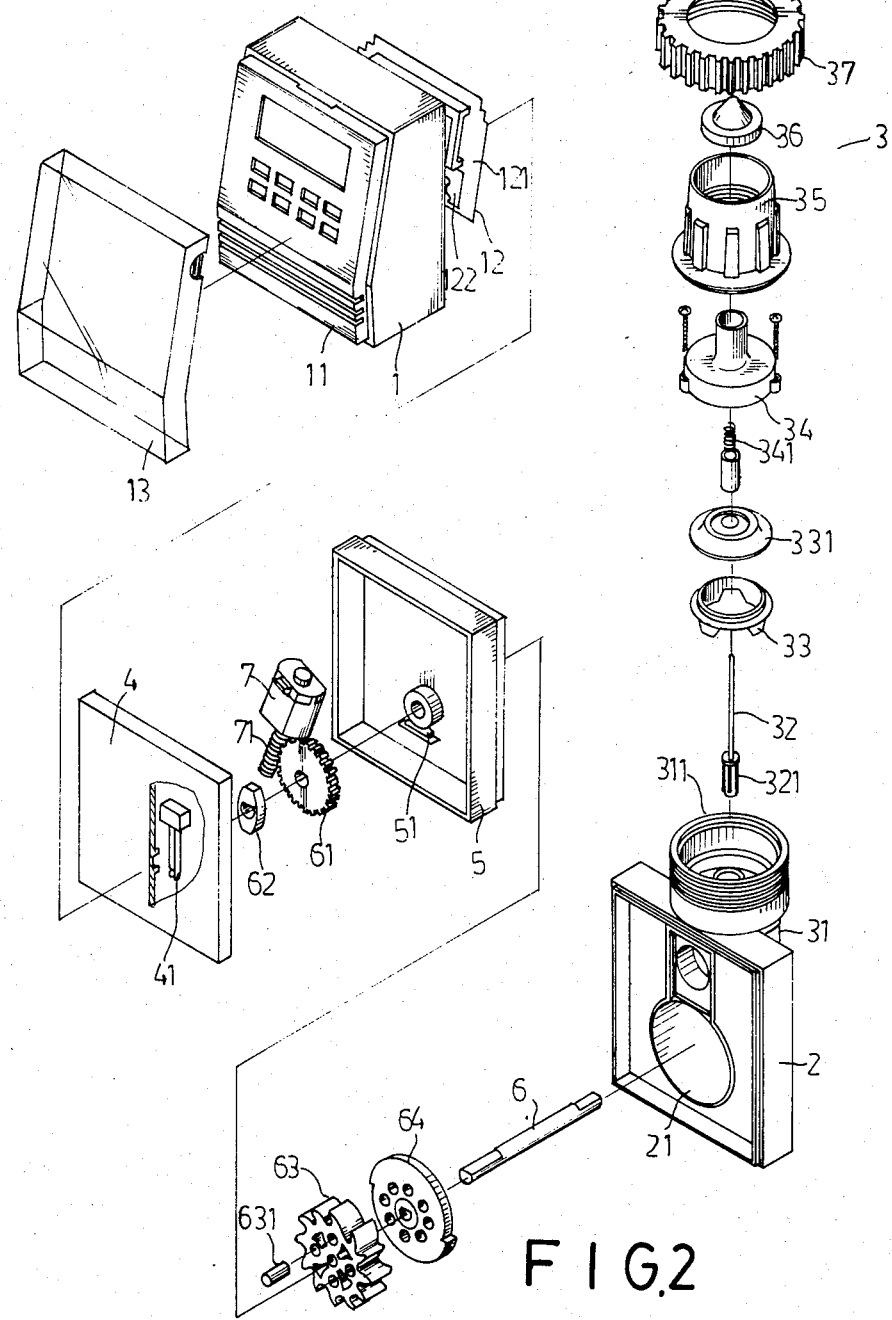
FIG. 2 is a fragmentary perspective view of FIG. 1.

Referring to the drawings and particularly to FIG. 2, a water-micro-controller (10) comprises a front cover portion (1) provided with a front panel (11). A control circuit (12) associated with a liquid crystal display (121) and a plurality of control keys (122) is disposed in the front cover portion (1) with the liquid crystal display (121) and the control keys (122) mounted on the front panel (11) thereof. A dust-protect cover (13) is disposed on the front panel (11) of the front cover portion (1) to protect the liquid crystal display (121) and the control keys (122) disposed therein.

A rear cover portion (2) capable of being secured to the front cover portion (1) is provided at its interior with a recess (21). A control valve mechanism (3) is integrally formed with the rear cover portion (2) and will be described later. A front plate (4) provided at the inner side with a limited switch (41) is arranged to be disposed in the front cover portion (1). A rear plate (5) having a reed relay (51) disposed thereon also is arranged to be located in the front cover portion (1) and adjacent to the front plate (4) thereof. A shaft (6) passing through the rear plate (5) is supported at both ends respectively to the front plate (4) and the rear cover portion (2). A gear sets (61) associated with a small cam (62) is secured to the shaft (6) and located between the front and rear plates (4) and (5). A motor (7) provided with a gear shaft (71) is disposed in such a manner that the gear shaft (71) is arranged to drive the gear sets (61) together with the shaft (6) to rotate. A water wheel (63) provided around the central axis with a plurality of magnetic sensor cores (631) is rotatably mounted on the shaft (6) such that when the water wheel (63) is driven to rotate by the water, the magnetic sensor cores (631) disposed therein can respectively cross the reed relay (51) thereof. The water wheel (63) is arranged to be received in the recess (21) of the rear cover portion (2). A special designed cam (64) is secured to the shaft (6) and received within the recess (21) of the rear cover portion (2).

Figure 3:
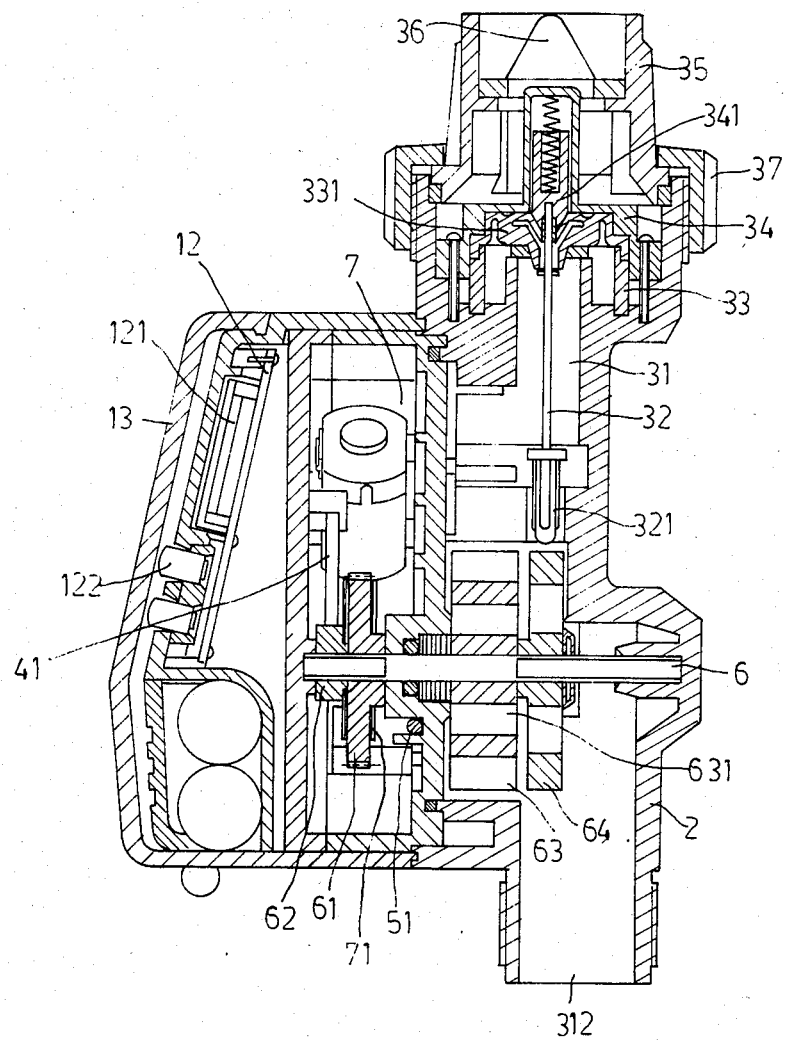
FIG. 3 is a cross-sectional view taken along the line A—A of FIG. 1.

The control valve mechanism (3) mainly comprises a cylindrical chamber (31) which is formed at the top with a round recess (311) and at the bottom with an inlet (312) (FIG. 3). A post (32) furnished with an enlarged end (321) is disposed in the cylindrical chamber (31) with its enlarged end (321) corresponding to the cam (64). A supporting frame (33) having a valve (331) disposed thereon is located in the round recess (311) of the cylindrical chamber (31) and corresponds to the post (32) thereof. A positioning cover (34) with a spring-loaded positioning plug (341) received therein is secured to the bottom side of the sound recess (311) of the cylindrical chamber (31) by means of screws or other suitable members. A connector (35) having a filter (36) disposed therein is mounted on the top of the positioning cover (34) and secured thereto by a top cover (37) which is threadedly engaged with the top of the cylindrical chamber (31). The controller (10) can be disposed between facets (not shown) to control the water flow rate therethrough.

Figure 4:
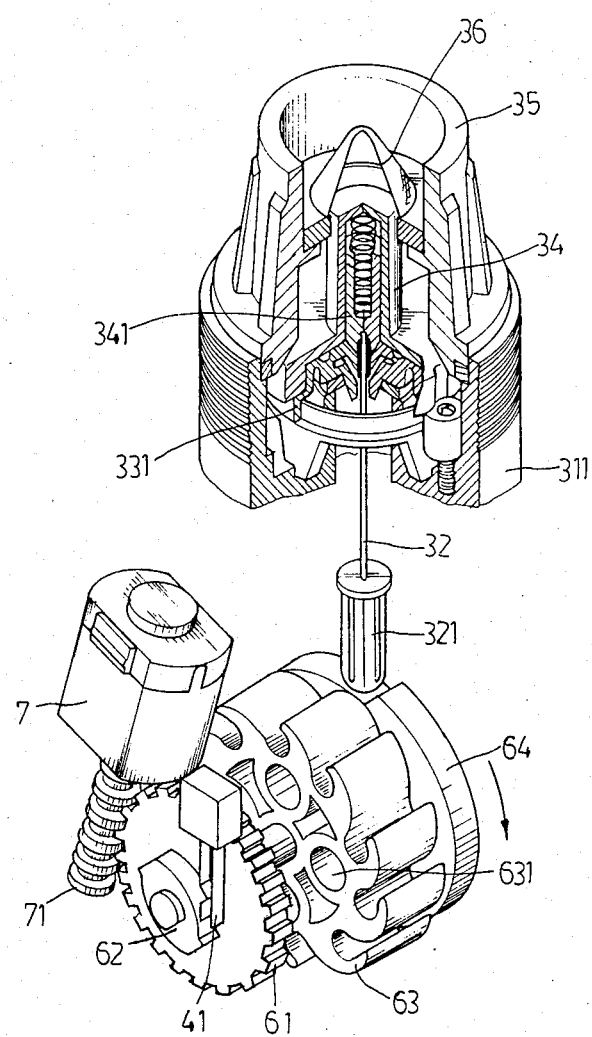
FIG. 4 is a local perspective view thereof illustrating the post being in its lower position while the valve being in its closed state.

Referring to FIGS. 3 and 4, when the water is emitted into the cylindrical chamber (31) through the inlet (312) thereof, the quantity of water flow rate can be detected in such a manner that the water wheel (63) received in the recess (21) of the rear cover portion (2) can be driven to rotate by the emitting water therefore the magnetic sensor cores (631) disposed in the water wheel (63) will cross the reed relay (51) of the rear plate (5) in sequence to actuate it in a corresponding frequency and then an equivalent signal generated by the reed relay (51) is fed into the control circuit (12) to be displayed on the liquid crystal display (121). Accordingly, the user can obtain the desired data directly from the liquid crystal display (121) to realize the corresponding water flow therethrough.

The control valve mechanism (3) is arranged to be controlled by the control circuit (12) associated with the motor (7). When the motor (7) is actuated by the control circuit (12), the gear (61) together with the shaft (6) will be rotated by the gear shaft (71) of the motor (7). Then the special designed cam (64) is rotated therewith to drive the post (32) to move up and down. As the post (32) is moved downward, the valve (331) will closely contact with the supporting frame (33) by the spring-loaded positioning plug (341) to block water passing through the cylindrical chamber (31). On the other hand, when the post (32) is moved upward, the valve (331) will be lifted up by the post (32) to allow the water emitted from the inlet (312) of the cylindrical chamber (31) to pass therethrough.

Referring to FIG. 4, when the post (32) is in its lower position while the valve (331) in its closed state, the small cam (62) will not contact with limited switch (41) of the front plate (4) so that the motor (7) can be actuated to drive the cam (64) to rotate in a predetermined manner and intends to move the post (32) upward to open the valve (331) thereof.

Figure 5:
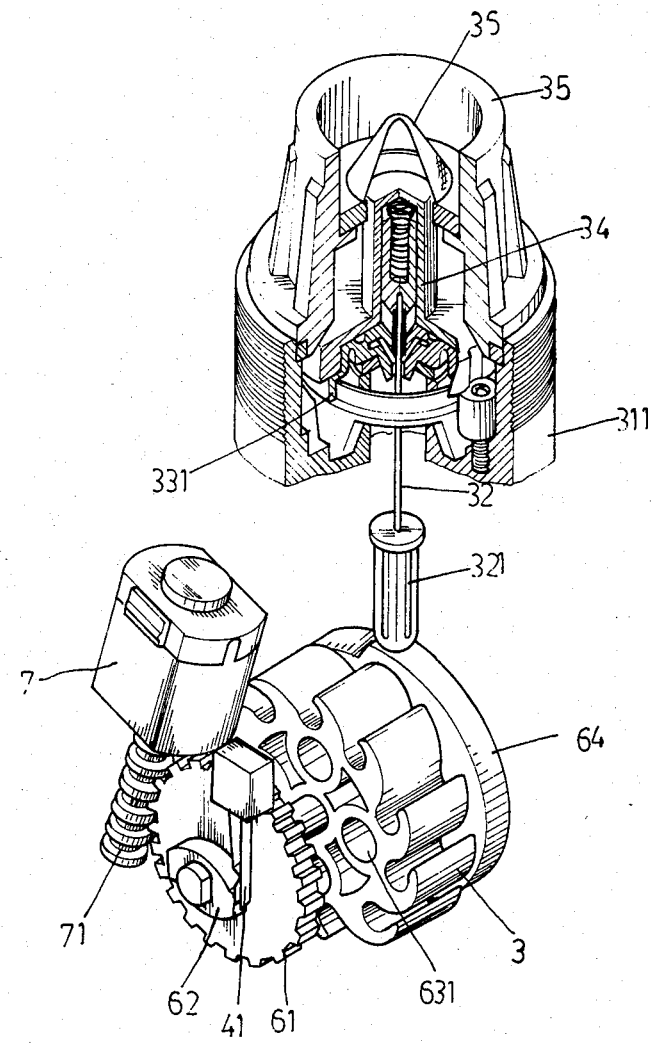
FIG. 5 is a local perspective view similar to FIG. 4 showing the post being in its upper position so that the valve can be opened by the post.

Referring to FIG. 5, as soon as the post (32) reaches its upper position and opens the valve (331) thereof, the small cam (62) will contact with the limited switch (41) of the front plate (4) to generate a signal which is used to turn off the motor (7) to make the valve (331) remain in its open state.

Then, the motor (7) is arranged to be actuated again after a predetermined discharging period set by the micro-controller program which is stored in the microcomputer to rotate the special designed cam (64) and hence to move the post (32) downward to make the valve (331) closed. It is noted that as soon as the small cam (62) disconnects from the limited switch (41) of the front plate (4), a corresponding signal will be generated to turn off the motor (7) to maintain the valve (331) in its closed state. Such procedures can be repeated in accordance with the requirements of the user.

In operation, the controller (10) can be disposed between the facets (not shown) to control the water flow rate therethrough. The function of the control keys (122) are described as follow:

1. OPEN/CLOSE key is used to control the valve (331) to stay in its open state or in its closed state.
2. AUTO/MANU key is used to make this controller operated either in automatic manner or in manual manner.
3. MFR (measure flow rate) key is used to measure the water pressure therein.
4. GA DSP (Gallons Display) key is used to display the total quantity of water.
5. CLOCK SET key is used to set the operating time and the current time.
6. T/P SET key (time/period set) is used to set the starting time and discharging time.
7. HR/DAY (hour/day) key is used to set the discharging time per day.
8. MIN (minute) key is used to set period of the spraying time by minute.

Accordingly, this present invention can detect the water pressure and water flow rate to precisely control the discharging time. Besides, the detecting technique thereof is different from that of the conventional mechanical gear detector thereby having longer life time. Furthermore, the discharging period can be set in accordance with the user's requirements.

It is noted that this invention further can comprise a humidity sensor to detect the humidity existing in the environment whereby as the humidity is beyond a predetermined value the present invention can automatically stop the discharging function.

I claim:

1. A water-micro-controller comprising:
   a front cover portion provided with a front panel, a control circuit associated with a liquid crystal display and a plurality of control keys being disposed in the front cover portion with the liquid crystal display and the control keys mounted on the front panel thereof, a dust-protect cover being disposed on the front panel of the front cover portion to protect the liquid crystal display and the control keys disposed on the front panel;
   a rear cover portion capable of being sealingly secured to the front cover portion being provided at its interior with a recess;
   a front plate provided at the one side with a limited switch being arranged to be disposed in the front cover portion;
   a rear plate having a reed relay disposed thereon being arranged to be located in the front cover portion and adjacent to the front plate thereof;
   a shaft passing through the rear plate being supported at both ends respectively to the front plate and the rear cover portion;
   a gear set associated with a small cam being secured to the shaft and located between the front and rear plates, the small cam being arranged to correspond to the limited switch of the front plate;
   a motor provided with a gear shaft being disposed in such a manner that the gear shaft is arranged to drive the gear set together with the shaft to rotate;
   a water wheel provided around the central axis with a plurality of magnetic sensor cores being rotatably mounted on the shaft such that the magnetic sensor cores will respectively cross the reed relay of the rear plate to be capable of actuating the reed relay as the water wheel is driven to rotate, the water wheel capable of being received in the recess of the rear cover portion;
   a special designed cam adjacent to the water wheel being secured to the shaft and received within the recess of the rear cover portion;
   a control valve mechanism being integrally formed with the rear cover portion, the control valve mechanism comprising a cylindrical chamber which is formed at the top with a round recess and at the bottom with an inlet, a post furnished with an enlarged end being disposed in the cylindrical chamber with its enlarged end corresponding to the cam, a supporting frame having valve disposed thereon being located in the round recess of the cylindrical chamber and corresponding to the post thereof, a positioning cover with a spring-loaded positioning plug received therein being secured to the bottom side of the round recess of the cylindrical chamber, a connector having a filter disposed therein being mounted on the top of the positioning cover and secured thereto by a top cover which is threadedly engaged with the top of the cylindrical chamber.

2. A water-micro-controller as claimed in claim 1 wherein said control valve mechanism is arranged to be driven by the motor which is controlled by microcontroller program.

3. A water-micro-controller as claimed in claim 1 wherein the water wheel associated with the magnetic sensor cores which can be detected by the reed relay is arranged to measure the water flow rate.

4. A water-micro-controller as claimed in claim 1 further comprising a humidity sensor to detect the humidity existing in the environment whereby as the humidity is beyond a predetermined value the water-micro-controller can automatically stop the discharging function.

* * * * *